United States Patent
Lulli et al.

[11] Patent Number: 5,870,196
[45] Date of Patent: Feb. 9, 1999

[54] OPTICAL THREE-DIMENSIONAL PROFILOMETRY METHOD BASED ON PROCESSING SPECKLE IMAGES IN PARTIALLY COHERENT LIGHT, AND INTERFEROMETER IMPLEMENTING SUCH A METHOD

[75] Inventors: Alfredo Lulli, Milan; Alfredo Carlo Lucia, Osmate Lentate; Marco Franchi, Ispra, all of Italy

[73] Assignee: European Community, Rue Alcide de Gasperi, Luxembourg

[21] Appl. No.: 733,812

[22] Filed: Oct. 16, 1996

[30] Foreign Application Priority Data

Oct. 16, 1995 [EP] European Pat. Off. .............. 95830439

[51] Int. Cl.$^6$ .............................. G01L 1/24; G01B 11/02
[52] U.S. Cl. ........................................ 356/357; 356/35.5
[58] Field of Search ........................... 356/35.5, 357–358

[56] References Cited

U.S. PATENT DOCUMENTS

| | | | |
|---|---|---|---|
| 5,020,904 | 6/1991 | McMahan, Jr. ......................... | 356/35.5 |
| 5,112,129 | 5/1992 | Davidson et al. ...................... | 356/359 |
| 5,402,234 | 3/1995 | Deck ...................................... | 356/357 |
| 5,432,595 | 7/1995 | Pechersky ............................... | 356/357 |
| 5,443,501 | 8/1995 | Barmada ................................. | 356/357 |

FOREIGN PATENT DOCUMENTS

WO 94/18523  8/1994  WIPO ............................ G01B 11/02

*Primary Examiner*—Frank G. Font
*Assistant Examiner*—Jason D. Vierra-Eisenberg
*Attorney, Agent, or Firm*—Darby & Darby

[57] ABSTRACT

An optical three-dimensional profilometry method in which are recorded SPECKLE images formed by the interference, due to different optical paths, of the rays reflected/diffused by a rough object and the rays generated by a beam source. The method presents a number of processing steps including the steps of digitizing a first SPECKLE image, modifying the optical path difference, and digitizing a second SPECKLE image recorded after modifying the optical path difference. The difference in the modulus of the corresponding pixels of the first and second digitized images is determined to generate a difference image which is subsequently analyzed. A first arbitrary value is assigned to all the difference image pixels exceeding a given threshold value, and a second arbitrary value is assigned to all the difference image pixels of a value below the threshold. The binary image so generated is processed to generate an artificial image in which all the binary image pixels equal to the second arbitrary value are assigned a zero value, and all the binary image pixels equal to the first arbitrary value are assigned a current processing step value. The processing steps are repeated cyclically for a predetermined number of steps to generate a depth map presenting a number of pixels. Each pixel represents a grey level corresponding to the last processing step in which the threshold was exceeded. The depth map contains three-dimensional information relative to the profile of the rough object under examination.

9 Claims, 4 Drawing Sheets

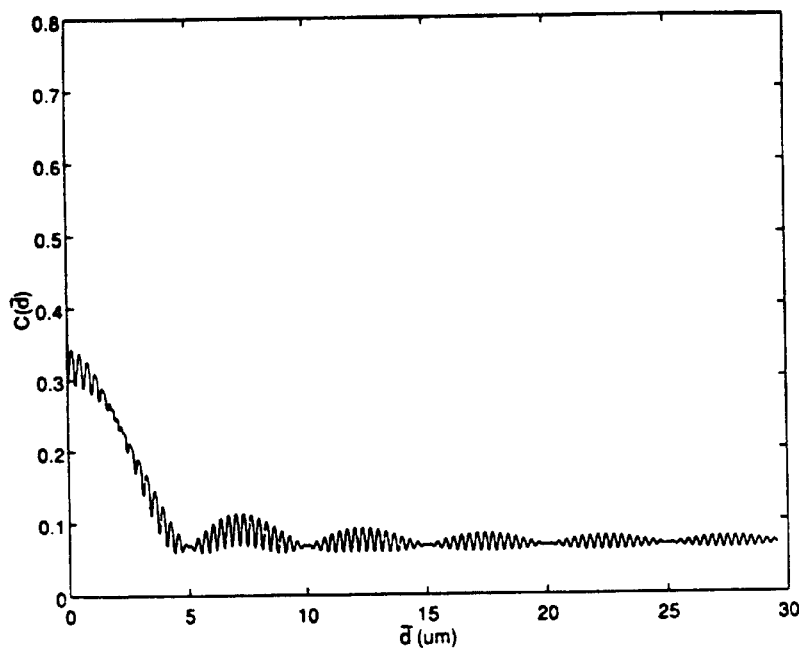
Fig. 2c
Fig. 2d
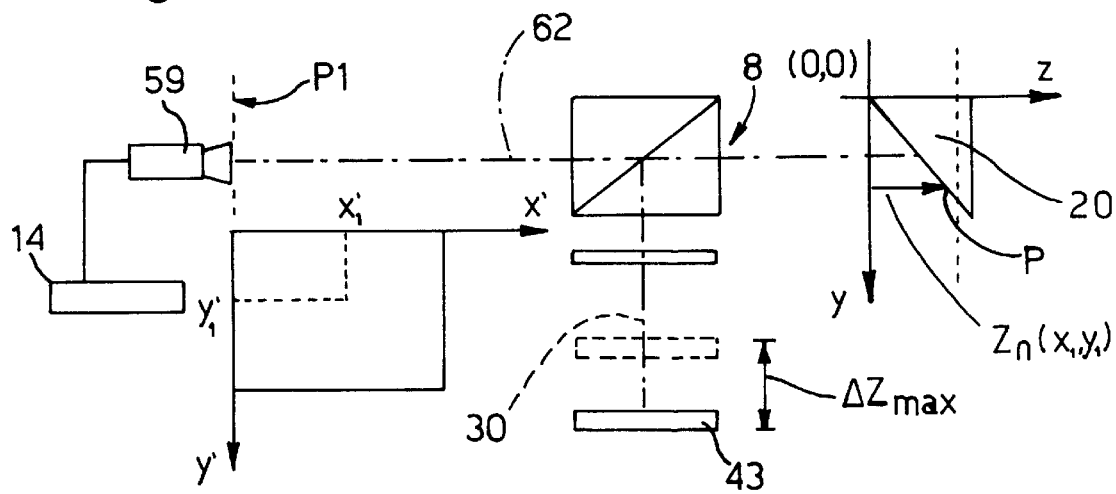

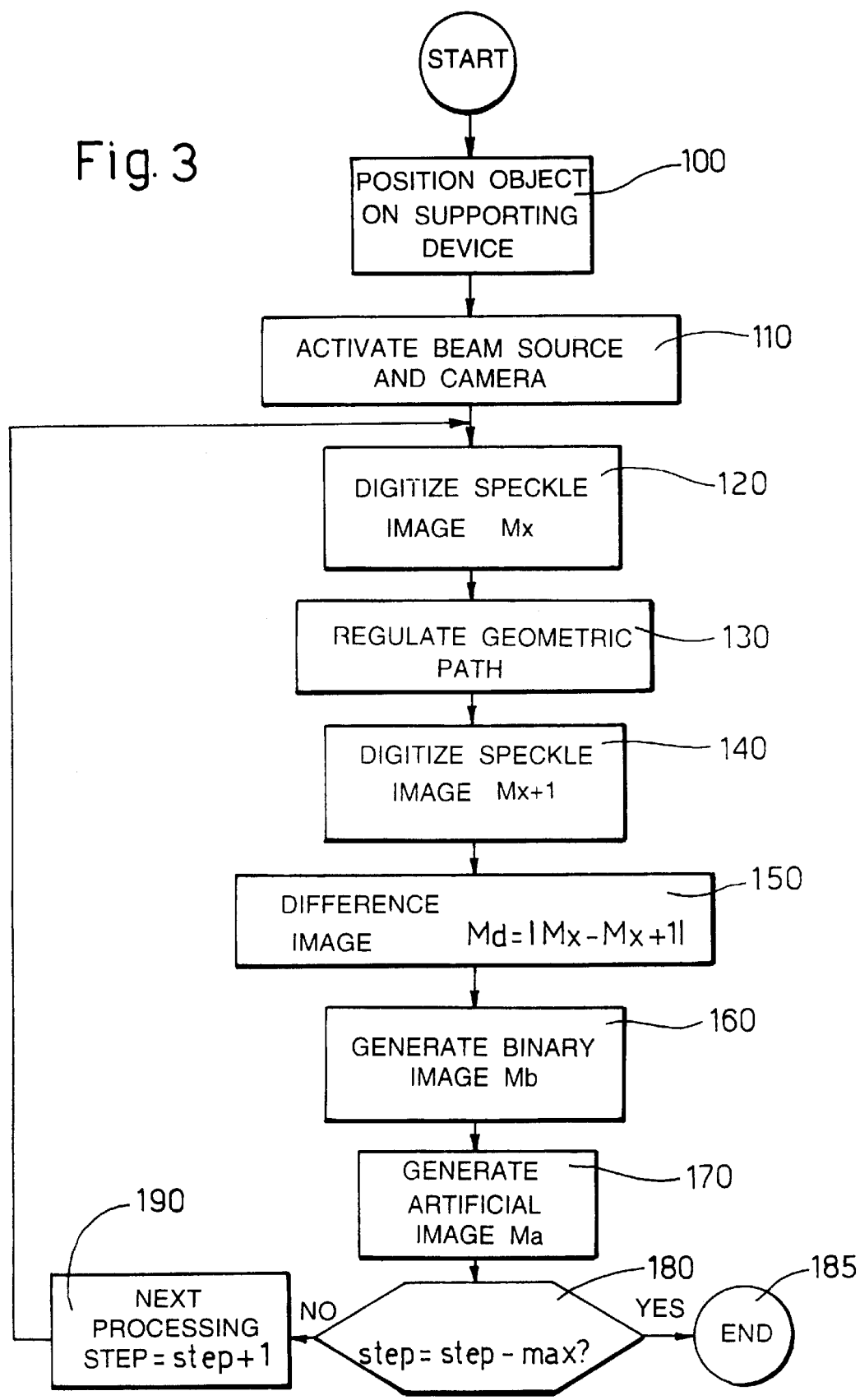

OPTICAL THREE-DIMENSIONAL PROFILOMETRY METHOD BASED ON PROCESSING SPECKLE IMAGES IN PARTIALLY COHERENT LIGHT, AND INTERFEROMETER IMPLEMENTING SUCH A METHOD

BACKGROUND OF THE INVENTION

The present invention relates to an optical three-dimensional profilometry method based on processing SPECKLE images in partially coherent light, and to an interferometer implementing such a method.

When laser sources first came into use in the 60's, a curious phenomenon, known as the SPECKLE effect, was observed, and which is produced when the surface of an object of a roughness comparable with the wavelength of visible light (450–700 nm) is illuminated by a beam of coherent light, in which case, the surface of the object presents a granular appearance of randomly distributed light and dark speckles. The SPECKLE effect is caused by multiple interference of the rays reflected by the object, which present randomly distributed phases due to the roughness comparable with the wavelength; and theoretical analysis of the effect is extremely complex, mainly due to the statistic characteristics of the roughness of the object and the coherence properties of the light employed.

As the statistic distribution of the light intensity of a SPECKLE image is not directly related to the microscopic structure of the rough surface generating the image, traditional interferometry techniques are of no avail for determining the profile of the object.

SUMMARY OF THE INVENTION

It is an object of the present invention to provide a method based on processing SPECKLE images in partially coherent light, and which provides for obtaining information relative to the three-dimensional profile of the object generating the SPECKLE images.

According to the present invention, there is provided an optical three-dimensional profilometry method based on processing SPECKLE images in partially coherent light, as claimed in claim 1.

The present invention also relates to an interferometer for three-dimensional profilometry based on processing SPECKLE images, as claimed in claim 7.

BRIEF DESCRIPTION OF THE DRAWINGS

A preferred, non-limiting embodiment of the present invention will be described by way of example with reference to the accompanying drawings, in which:

FIG. 2c shows a graph of a parameter of the SPECKLE image;

FIG. 2d shows a step in the method according to the present invention;

FIG. 3 shows a logic block diagram of the operations performed in the method according to the present invention.

DETAILED DESCRIPTION OF THE INVENTION

Figure 1:
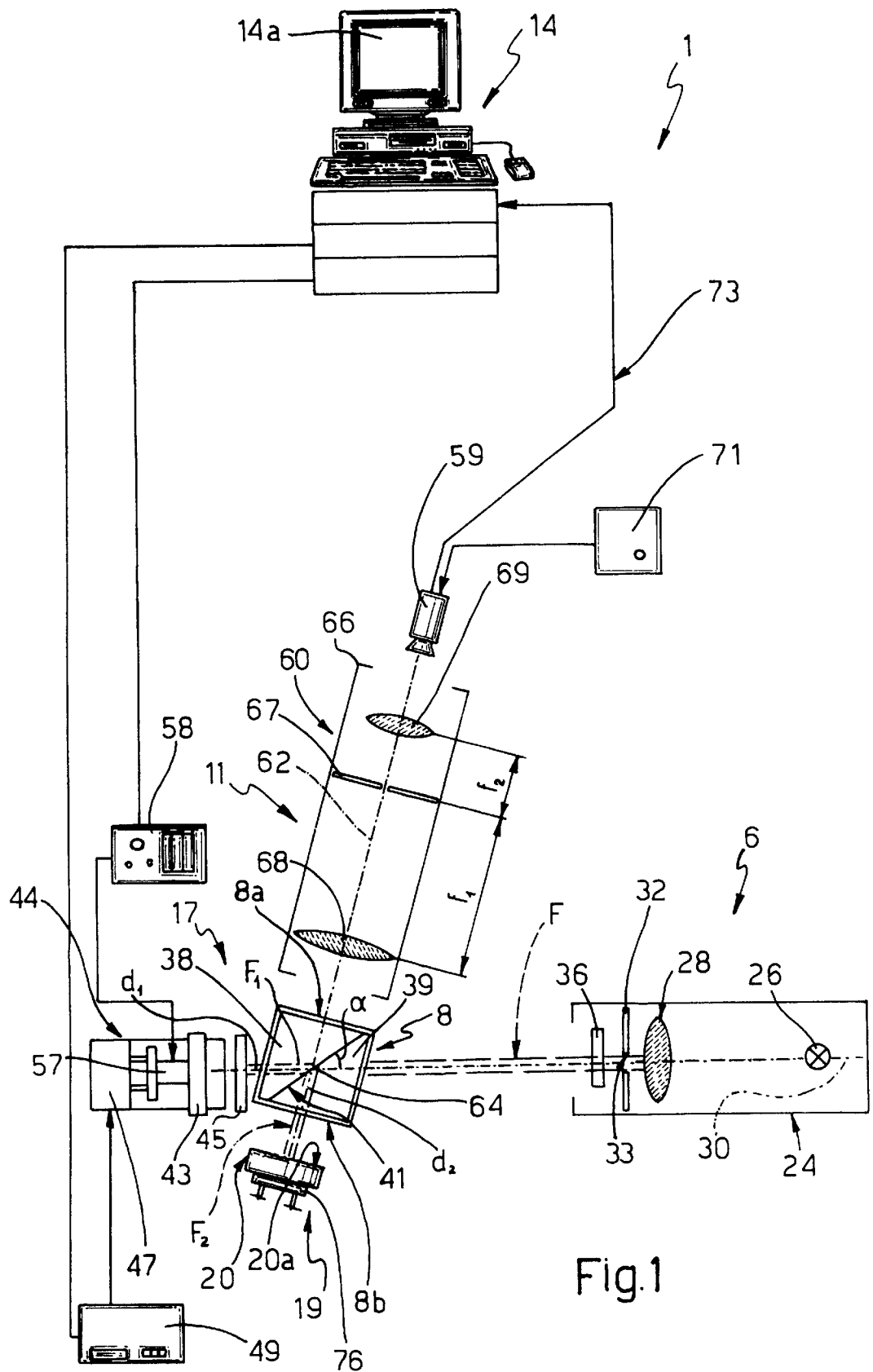
FIG. 1 shows, schematically, an interferometer implementing the method according to the present invention.

Number 1 in FIG. 1 indicates a Michelson interferometer comprising a light beam source 6; a beam splitter 8 supplied with a beam from source 6; a viewing device 11 connected to beam splitter 8; a central processing unit 14 communicating with viewing device 11, and controlling a reflecting device 17 cooperating with beam splitter 8; and a supporting device 19 facing beam splitter 8 and for positioning an object 20 for examination.

More specifically, beam source 6 comprises an outer casing 24 (shown schematically) open at one end and housing a light source 26 conveniently comprising a halogen lamp for generating white light (comprising the whole visible spectrum), and a collimating system 28 for receiving the rays produced by lamp 26 and generating a beam comprising rays substantially parallel to an optical axis 30. For the sake of simplicity, collimating system 28 in FIG. 1 is shown as comprising a single biconvex lens facing light source 26, but may obviously be designed differently and comprise a number of lenses, e.g. a pair of lenses (not shown) connected to each other, and for reducing the chromatic aberration inevitably produced by the lenses due to the nonmonochromaticity of the light source. Beam source 6 also comprises a diaphragm 32 located on the opposite side of collimating system 28 to lamp 26, and defining an adjustable-diameter opening 33 coaxial with optical axis 30. Diaphragm 32 is similar to those normally used in cameras, and provides for regulating the aperture of the beam generated by source 6. Finally, source 6 also comprises a filter 36 crosswise to optical axis 30, located on the opposite side of diaphragm 32 to collimating system 28, and conveniently comprising a band-pass filter, e.g. interferential, for filtering the white light produced by halogen lamp 26 and collimated by system 28, and generating at the output of casing 24 a filtered beam F comprising rays substantially parallel to optical axis 30.

Beam splitter 8 is located along optical axis 30, is supplied with beam F, is in the form of a cube, and comprises two opposite prisms 38, 39 (with a right-triangle section) bonded to a common flat surface 41 inclined in relation to axis 30. More specifically, the line of surface 41 defines an angle α of slightly less than 45° with optical axis 30, and surface 41 provides for reflecting/transmitting beam F (as described below) towards supporting device 19 and reflecting device 17.

Reflecting device 17 is located on the opposite side of beam splitter 8 to beam source 6, and comprises a flat reference mirror 43 crosswise to axis 30 and fitted to a position regulating device 44 for moving mirror 43 along axis 30; and a filter 45 for adapting the light intensity of the beam reflected by mirror 43 to the intensity of the beam reflected and diffused by object 20. More specifically, position regulating device 44 comprises a linear actuator 47 (e.g. a worm type) connected to central unit 14 via the interposition of a drive circuit 49, and which provides for moving mirror 43 along axis 30 in controlled incremental shifts of about 1 micron; and a piezoelectric actuator 57 connected to central unit 14 via the interposition of a drive circuit 58, and which provides for moving mirror 43 along axis 30 in controlled incremental shifts of hundredths of a micron. Piezoelectric actuator 57 therefore presents a greater "resolution" (in the sense of a smaller controllable shift) as compared with linear actuator 47, and provides for "fine" adjustment of the position of flat mirror 43 in relation to beam splitter 8.

Viewing device 11 comprises a television camera 59, in particular a black/white CCD (CHARGED COUPLED DEVICE) camera; and a focusing device 60 connected to camera 59 and facing beam splitter 8, and presenting an optical axis 62 intersecting optical axis 30 at intersection 64 on surface 41, and inclined by slightly less than 90° in relation to axis 30. Focusing device 60 receives the rays from beam splitter 8, and focuses them on the sensitive element (not shown) of camera 59. More specifically, focusing device 60 only provides for focusing on camera 59 the incoming rays parallel to optical axis 62. In the FIG. 1 embodiment, focusing device 60 (shown schematically) comprises an elongated casing 66 open at opposite ends and housing a diaphragm 67 crosswise to optical axis 62, and a pair of biconvex lenses 68, 69 crosswise to optical axis 62 and on either side of diaphragm 67. In particular, lens 68 is positioned facing face 8a of beam splitter 8, and presents a focal distance f1 from diaphragm 67; and lens 69 is positioned facing camera 59, and presents a focal distance f2 from diaphragm 67. Camera 59 also presents a supply circuit (driver) 71, and is connected to central unit 14 by a data line (BUS) 73.

Supporting device 19 is located on the opposite side of beam splitter 8 to viewing device 11, and comprises a supporting surface 76 parallel to and facing face 8b, opposite face 8a, of beam splitter 8; and the object 20 for examination is placed on surface 76 and positioned facing face 8b of beam splitter 8.

In actual use, the beam F produced by source 6 impinges on and penetrates inside beam splitter 8; a first portion F1, of beam F travels through surface 41 to impinge on reference mirror 43 by which it is reflected back to beam splitter 8, and is then reflected by surface 41 to focusing device 60 which focuses it on camera 59; and a second portion F2 of beam F is reflected by surface 41 to impinge on supporting device 19. If, instead of rough object 20, supporting device 19 presents a second mirror (not shown) for reflecting the whole of incident portion F2, portion F2 is directed back to and travels through beam splitter 8 to focusing device 60. Beam portions F1 and F2 impinging on focusing device 60 present substantially the same intensity (each comprising 50% of the energy of the incident beam), and are offset in relation to each other due to the difference D in the optical paths travelled respectively by the rays of portions F1, F2 impinging on viewing device 11. In particular, optical path difference D is proportional to the geometric path difference (|d1 −d2|) between the distance d1 measured along axis 30 between point 64 and the reflecting surface of reference mirror 43, and the distance d2 measured along optical axis 62 between point 64 and the reflecting surface of object 20, i.e. D $\alpha$|d1 −d2|.

Figure 2A:
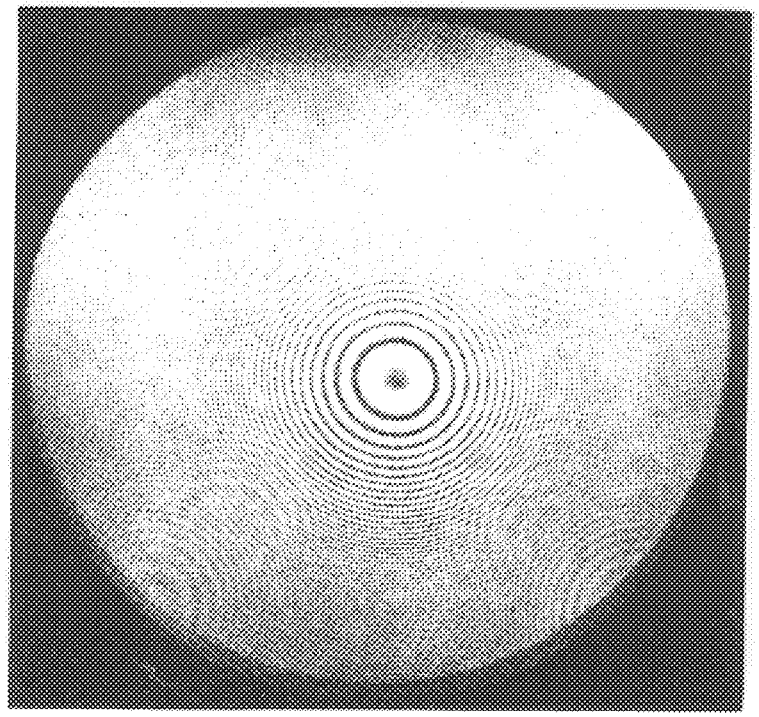
FIG. 2a shows an optical effect caused by the interference of waves.

The interference (if supporting device 19 presents a second mirror) between the rays of portions F1 and F2 entering viewing device 11 is picked up by camera 59; and, with an appropriate optical path difference and mirror arrangement, camera 59 picks up an image (FIG. 2a) comprising a number of concentric rings (known as Newton's rings) and in which the adjacent rings are of different colours (light/dark). More generally speaking, the interference figure presents alternating (light/dark) interference fringes of various shapes.

By analyzing the shape of the fringes, it is possible, by means of known mathematical methods, to determine the geometric characteristics of the mirrors (e.g. the radius of curvature).

Figure 2B:
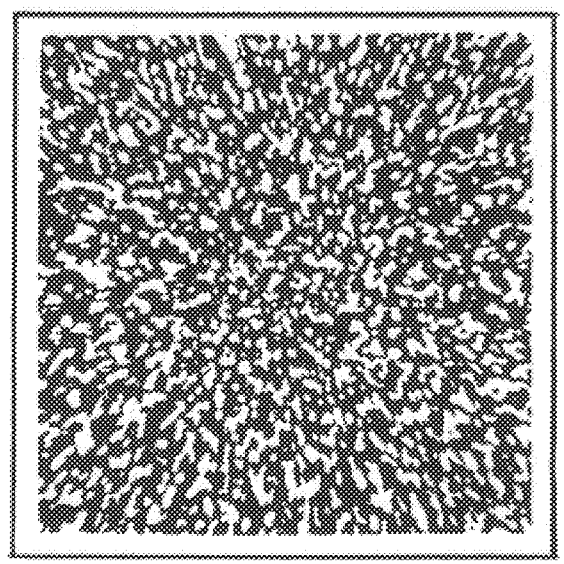
FIG. 2b shows a typical SPECKLE image.

If supporting device 19 presents an object with a non-specular surface (rough object) by which the rays impinging on it are reflected and scattered in a number of randomly oriented directions, the image picked up by the camera (FIG. 2b) assumes a typical granular appearance comprising randomly arranged light and dark specks. This is what is known as the SPECKLE effect, and, for the sake of simplicity in the following description, the images of the above type will be referred to as SPECKLE images. From one SPECKLE image, it is impossible to determine the geometric (microscopic or macroscopic) characteristics of the object generating it. Nor is this possible using a number of SPECKLE images and known PHASE-SHIFTING techniques, due to the phase being randomly distributed in the images. According to the present invention, there is provided a method of sequentially acquiring a number of SPECKLE images, and so processing the images as to determine the geometric characteristics of the object by which they were generated.

Operation of interferometer 1 controlled by central processing unit 14 according to the method of the present invention will now be described with reference in particular to FIG. 3.

In a first block 100, an object 20 is positioned on supporting device 19. The roughness of observation surface 20a of object 20 facing beam splitter 8 presents a standard deviation (variance) comparable with the central wavelength $\lambda$ of the spectrum of the light radiation of beam F.

Block 100 is followed by block 110 which provides for activating beam source 6 (turning on halogen lamp 26 and adjusting the aperture of diaphragm 32) and viewing device 11 (turning on camera 59 and adjusting the aperture of diaphragm 67), so that camera 59 acquires a black and white SPECKLE image of rough object 20, which image is supplied to central unit 14 and displayed on a monitor 14a of unit 14.

Block 110 is followed by block 120 wherein the acquired SPECKLE image is digitized and converted into a square matrix Mx of pixels i,j, wherein, for example, i and j range from 0 to 512, and wherein each pixel i,j corresponds to a grey level Ix(i,j) expressed as a whole number (e.g. grey level Ix(i,j) defined by a digital number from 0 to 255 in the case of eight-bit digitization.

Block 120 is followed by block 130 which regulates the position of reflecting device 17. More specifically, reference mirror 43 is moved along axis 30 by one incremental step of a predetermined quantity $\delta$ and numbered with a whole STEP index.

Block 130 is followed by block 140 which digitizes the SPECKLE image acquired after moving reference mirror 43, to generate a digitized SPECKLE image defined by a pixel matrix Mx+1 of the same size as matrix Mx (512×512 pixels) and comprising pixels of values Ix+1(i,j).

Block 140 is followed by block 150 in which the images acquired and digitized respectively in blocks 120 and 140 are compared. More specifically, block 150 determines the difference between the corresponding pixels Ix(i,j) and Ix+1 (i,j) of matrixes Mx and Mx+1, calculates the modulus of said difference, and generates a difference matrix Md comprising grey levels Id (i,j), i.e.

$$Id(i,j)=|Ix(i,j)-Ix+1(i,j)|$$

A commonly used parameter for characterizing the light intensity statistics of a SPECKLE image is contrast C, which, in a SPECKLE image, is defined as the ratio of variance $\sigma$ to the mean value Im of the probability distribution p(I) of the intensity, i.e.

$$C=\sigma/Im \qquad (1.1)$$

The inventors of the present invention have observed and determined theoretically that the contrast C of a SPECKLE image varies as a function of the geometric path difference according to a curve of the type shown in FIG. 2c. As shown clearly in the FIG. 2c curve, for variation s in the geometric path difference of less than half the coherence length Lc/2 of the light employed, the variation in contrast C is considerable and, at any rate, detectable; whereas, for variations in the geometric path difference of over half the coherence length Lc/2, the variation in contrast C is small and less noticeable.

Moreover, for geometric path differences considerably in excess of Lc/2, contrast C tends to assume a constant value of other than zero.

The contrast C of a digitized SPECKLE image may be determined from the grey levels of a suitable portion of the matrix (e.g. 32×32 pixels).

The coherence length Lc of light with a Gaussian spectrum centered at $\lambda$ may be expressed as the ratio between the square of the wavelength $\lambda$ and the width $\Delta\lambda$ at the mid point of the height of the spectrum, i.e.

$$Lc = \lambda^2 / \Delta\lambda \quad (1.2)$$

As such, if the surface e of the object being observed is not perfectly flat and located in a plane whose image, through beam splitter 8, is not perfectly parallel to the reflecting surface of flat mirror 43, the contrast of the SPECKLE images varies from one region to another of the image. In fact, different geometric path differences are measured at different points of surface 20a of object 20.

With reference to difference matrix Md and FIG. 2c, if the block 130 shift 6 (which may present a much lower value than $\lambda$) is made in the maximum contrast variation region, values Id(i,j) will be other than zero, and more specifically may exceed a predetermined threshold Is. Conversely, if shift 6 is made outside the region, there will be no appreciable variation in contrast, and values Id(i,j) will be substantially zero or at any rate below threshold Is.

In other words, the regions of difference matrix Md in which the grey level Id(i,j) exceeds threshold Is (modulation regions) correspond to regions of the object in which the geometric path difference is less than half the coherence length, i.e. |d1−d2<Lc/2. In block 160 downstream from block 150, the modulation regions are "selected"; an arbitrary first grey level value A (e.g. 255) is assigned to all the pixels in Md with a value Id(i,j) above threshold Is; an arbitrary second grey level value B (e.g. 0) is assigned to all the pixels in Md with a value Id(i,j) below or equal to threshold Is; and a binary output image (matrix Mb) is generated comprising pixels Ib(i,j) of value B=0 or A=255, the pixels of arbitrary first value A=255 therefore indicating the modulation regions.

Block 160 is followed by block 170 which generates an artificial image (matrix Ma) wherein only the pixels in Mb of value A=255 are assigned a current processing STEP value. Of the other pixels in Mb, the grey level value assigned in the previous step is left unchanged: for STEP=1, a zero value is assigned; for STEP>1, it contains the value recorded in Ma in the previous step.

Block 170 is followed by block 180 which determines whether the current STEP value equals a maximum STEP-MAX value. If it does, block 180 goes on to block 185; if it does not, block 180 goes on to block 190, which updates the STEP value—STEP=STEP+1—and then goes back to block 120.

At the end of the acquisition procedure, after performing a complete scan of reference mirror 43, block 185 detects a matrix Ma comprising a number of pixels, each presenting a grey level Ia(i,j) corresponding to the last STEP value at which threshold Is was exceeded. Matrix Ma thus defines a depth map containing three-dimensional information relative to the profile of object 20, and which is memorized by block 185 and made available for the next processing step in the reconstruction of the profile.

The information in the depth map is interpreted as follows.

Given a cartesian reference system X, Y, Z (FIG. 2d) in which the Z axis is parallel to optical axis 62 of device 11, and plane Z=0 is adjacent to the surface of object 20, the position of plane Z=0 is determined in the initializing procedure, and its points present a geometric path difference |d1−d2| of zero.

The value recorded in depth map Ma is directly related to dimension Zn(Xi,Yj) of a point P on the surface of object 20.

If $\Delta Zmax$ is the total shift of reference mirror 43 throughout the data acquisition procedure, $\Delta Zmax$ is effected by means of a number Ntot =STEP-MAX of steps of quantity $\delta$ by reflecting device 17.

Consequently, $$Zn(Xi,Yj) = (Ia(i,j) \cdot \Delta Zmax)/(Ntot) \quad (1.3)$$

where Zn(Xi,Yj) is the dimension of point P in relation to plane Z=0.

Assigning an X', Y' reference system in the image plane PI of camera 59, the coordinates (X'i,Y'j) of the center of the pixel relative to pair i,j are given by:

$$\begin{cases} X'i = (2i+1)\frac{dx'}{2} \\ Y'j = (2j+1)\frac{dy'}{2} \end{cases} \quad (1.4)$$

where dx' and dy' indicate the dimensions of the pixels of the CCD sensor.

Taking into account the magnification Mx of viewing device 11:

$$\begin{cases} Xi = (2i+1)\frac{dx'}{2Mx} \\ Yj = (2j+1)\frac{dy'}{2Mx} \end{cases} \quad (1.5)$$

which assigns a relationship between the element (i,j) of the depth map and a real point on the surface of the object of coordinates Xi, Yj.

As such, the depth map contains all the information required to reconstruct the three-dimensional profile of the object being examined.

By processing the SPECKLE images, the method according to the present invention therefore provides for obtaining accurate information relative to the three-dimensional profile of the object generating the images, and as such for three-dimensionally measuring the profile, without moving or physically contacting the object, over the entire surface of the object, and over an area of as much as a few square centimeters, thus affording considerable advantages as compared with known point-by-point surface scanning techniques.

The operations in the above procedure employ straightforward algorithms and require very little processing time; and measurement of the profile is highly accurate (1 to 100 micron resolution) and made using an extremely straightforward procedure (FIG. 3). As regards the resolution of the depth measurement Zn(Xi,Yj), also known as vertical resolution, this depends solely on the accuracy with which the values of depth map Ma are assigned, and not on the optical characteristics of the interferometer system. Since a value Ia(i,j) is only assigned if the following equation is met:

$$|Ix(i,j)-Ix+1(i,j)|>Is \qquad (1.6)$$

and since the above condition is met for the portions of the image presenting adequate local variations in contrast in that particular processing step, vertical resolution may safely be estimated in the order of (or less than) the coherence length of the light employed. For which purpose, filter 36 provides for varying the coherence length of the light generated by lamp 26 to adapt the vertical resolution to the requirements of the profile to be examined. With interferometer 1 according to the present invention, vertical resolution is adjusted extremely easily by simply modifying filter 36.

Lateral resolution, on the other hand, depends on the size of the pixels of the sensor (camera 59) and on magnification Mx of viewing device 11 (typically of about ten micron).

We claim:

1. An optical three-dimensional profilometry method based on processing SPECKLE images in partially coherent light, the method comprising the steps of:

generating a light beam;

splitting said beam and directing a first portion of the beam to a viewer;

directing a second portion of the beam onto a rough object for examination, and collecting the rays reflected and diffused by the object by means of said viewer;

acquiring, with said viewer, a first SPECKLE image formed by interference between the rays of said first portion and the rays from said object;

digitizing the first SPECKLE image and converting it into a first matrix of pixels, wherein each pixel corresponds to a grey level;

modifying the geometric path difference of the paths travelled by the rays of said first portion and the rays of said second portion;

digitizing a second SPECKLE image acquired following said modification of the geometric path difference and generating said digitized second SPECKLE image defined by a second matrix of pixels;

comparing the first digitized SPECKLE image with the second digitized SPECKLE image, determining the difference in the modulus of the corresponding pixels of the first and second images and generating a difference image;

analyzing said difference, assigning a first arbitrary value to all the pixels in the difference image exceeding a threshold value, assigning a second arbitrary value to all the pixels in the difference image representing a value below or equal to said threshold, and generating a binary image; and using said binary image to generate an artificial image by assigning a current processing step value solely to the pixels in the binary image representing a value equal to a first arbitrary value; the value assigned to the other pixels in the binary image in the previous processing step being left unchanged;

said method also comprising a cyclic repetition of a predetermined number of said processing steps, terminating a data acquisition step upon said predetermined number of processing steps being reached, and generating a final matrix comprising a number of pixels, each representing a value corresponding to the last processing step value at which said threshold was exceeded;

said final matrix defining a depth map containing three-dimensional information related to the profile of the rough object under examination.

2. A method as claimed in claim 1, wherein said step of directing first portion of said beam to said viewer comprises the step of directing said beam to a beam splitter cooperating with a reference mirror;

said reference mirror receiving part of the light energy of the beam travelling through said splitter, and reflecting said light energy to said to the splitter which directs said first portion of the beam to said viewer.

3. A method as claimed in claim 2, wherein said step of directing a second portion of said beam onto a rough object for examination comprises the steps of directing said beam onto said beam splitter to reflect part of the energy of said beam on to said object and detecting the rays reflected and diffused by the object and travelling through said beam splitter to said viewer.

4. A method as claimed in claim 2, wherein said step of modifying the geometric path difference comprises the step of adjusting the distance between said beam splitter and said reference mirror by moving said reference mirror, at each processing step, by at least one step of a constant quantity.

5. A method as claimed in claim 4, and further including the step of memorizing said depth map and performing a profile processing step using said map.

6. A method as claimed in claim 5, wherein said profile processing step comprises the step of calculating at least one dimension of a point P on the surface of the object according to the equation:

$$Zn(Xi,Yj)=(Ia(ij). \Delta Zmax/(Ntot)$$

where $Zn(Xi,Yj)$ is the dimension of point P in relation to a reference plane, and $\Delta Zmax$ is the total shift of said reference mirror.

7. An interferometer for three-dimensional profilometry based on processing SPECKLE images in partially coherent light said interferometer including:

light beam generator and a filter modifying the coherence length of the rays of said beam;

a splitter facing said beam generator and receiving an incoming beam produced by said generator;

a reflector facing said beam splitter and intercepted by a first portion of said incoming beam travelling through said beam splitter, said reflector comprising a position regulator for adjusting the distance between said reflector and said beam splitter by moving said reflector in successive steps of a constant quantity;

a viewer cooperating with said beam splitter and receiving said first portion reflected by said reflector;

said beam splitter also directing a second portion of said incoming beam onto to rough object for profile examination, to direct the rays reflected and diffused by the object towards said viewer;

an electronic recorder connected to said viewer and which provides for acquiring a SPECKLE image formed by interference between the rays of said first portion and the rays from said object; and a control unit for sequentially processing a number of SPECKLE images to obtain three-dimensional information related to the profile of the rough object under examination.

8. An interferometer as claimed in claim 7, wherein said reflector further comprises a reference mirror facing said beam splitter and located on the opposite side of said beam splitter to said beam generator.

9. An interferometer as claimed in claim 8, wherein said control unit includes a processor comprising:

a first acquisition device for digitizing a first SPECKLE image and converting it into a matrix of pixels, wherein each pixel corresponds to a grey level;

a controller for controlling said position regulating means, and controlling at least one step of said reference mirror to modify the geometric path difference between the paths travelled by the rays in said first portion and by the rays in said second portion;

a second acquisition device for digitizing a SPECKLE image recorded after said modification of the geometric path difference, and generating a second digitized SPECKLE image defined by a matrix of pixels;

a comparator for comparing the first digitized SPECKLE image with the second digitized SPECKLE image, determining the difference in the modulus of the corresponding pixels of the first and second images, and generating a difference image;

a first computer for analyzing said difference image, assigning a first arbitrary value to all the pixels in the difference image exceeding a threshold value, assigning a second arbitrary value to all the pixels in the difference image presenting a value below or equal to said threshold, and generating a binary image; and a second computer for using said binary image to generate an artificial image by assigning a current processing step value solely to the pixels in the binary image presenting a value equal to the first arbitrary value; the value assigned to the other pixels in the binary image in the previous processing step being left unchanged by the second computer;

said control unit also comprising a cyclic repeater for selecting said processor for a predetermined number of processing steps, terminating processing upon said predetermined number of processing steps being reached, and generating a final matrix comprising a number of pixels, each presenting a value corresponding to the last processing step value at which said threshold was exceeded; said final matrix defining a depth map containing three-dimensional information relative to the profile of the rough object [(20)] under examination.

* * * * *